United States Patent
Ide

(10) Patent No.: US 8,190,002 B2
(45) Date of Patent: May 29, 2012

(54) IMAGE SUPPLYING DEVICE, IMAGE SUPPLY SYSTEM, IMAGE SUPPLYING METHOD, AND COMPUTER PROGRAM PRODUCT

(75) Inventor: Kentaro Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 12/727,433

(22) Filed: Mar. 19, 2010

(65) Prior Publication Data

US 2010/0239224 A1    Sep. 23, 2010

(30) Foreign Application Priority Data

Mar. 23, 2009   (JP) .................................. 2009-069671

(51) Int. Cl.
*H04N 5/783*      (2006.01)

(52) U.S. Cl. ....................................... 386/343; 386/345

(58) Field of Classification Search .................. 386/343, 386/345, 344, 347, 350, 323, 248
See application file for complete search history.

(56) References Cited

U.S. PATENT DOCUMENTS

| | | | |
|---|---|---|---|
| 2003/0071971 A1* | 4/2003 | Jo | .................................... 352/44 |
| 2006/0051057 A1 | 3/2006 | Nakagawa | |
| 2007/0201818 A1 | 8/2007 | Choi et al. | |

FOREIGN PATENT DOCUMENTS

| | | |
|---|---|---|
| CN | 101026755 A | 8/2007 |
| JP | 2002-238028 A | 8/2002 |
| JP | 2006-074531 A | 3/2006 |

* cited by examiner

*Primary Examiner* — Robert Chevalier
(74) *Attorney, Agent, or Firm* — AdvantEdge Law Group, LLC

(57) ABSTRACT

An image supplying method includes the steps of: transmitting encoded video data including a key frame that is encoded by an inter-frame encoding process; receiving a seek operation and acquires a first play point in a desired seek position of the encoded video data; determining a search range including the acquired first play point; searching for key frames from the determined search range; determining a position of a key frame having a shortest distance from the first play point as a second play point in a case where the key frame is detected from the search range by the key frame searching unit; and transmitting the encoded video data from the key frame corresponding to the determined second play point.

12 Claims, 7 Drawing Sheets

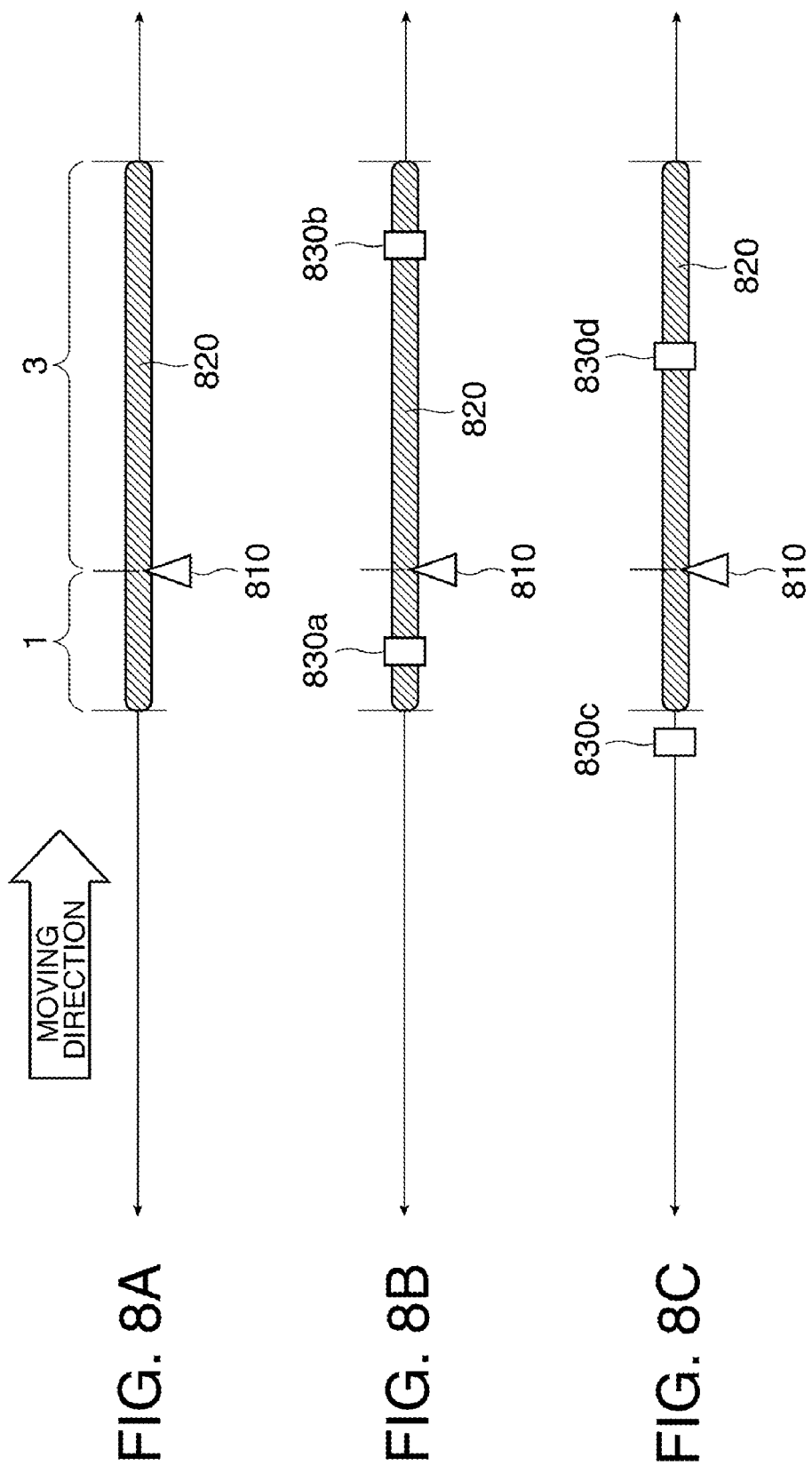

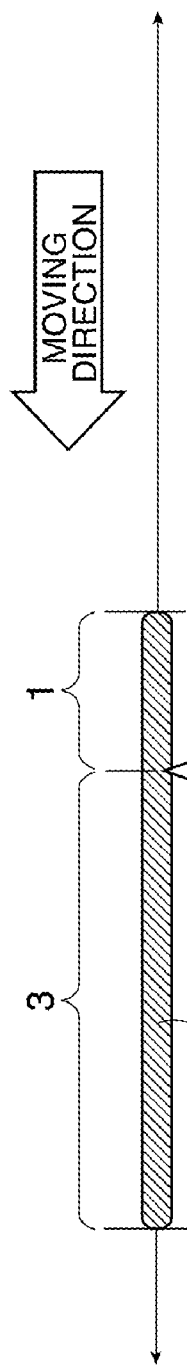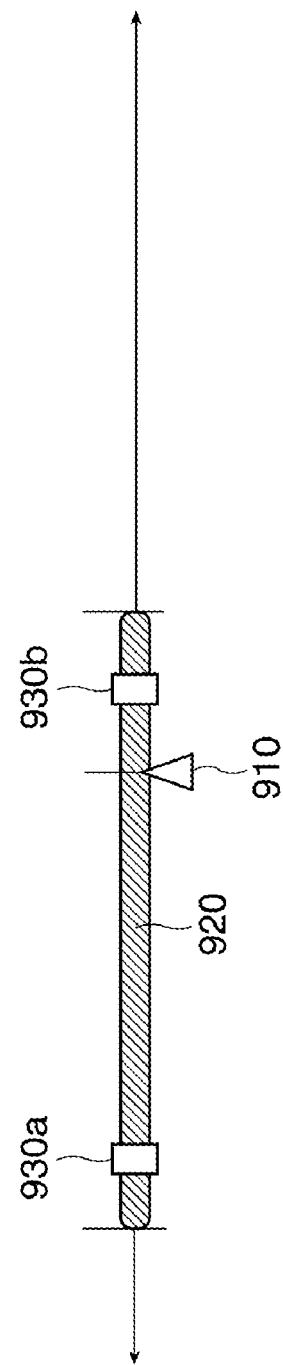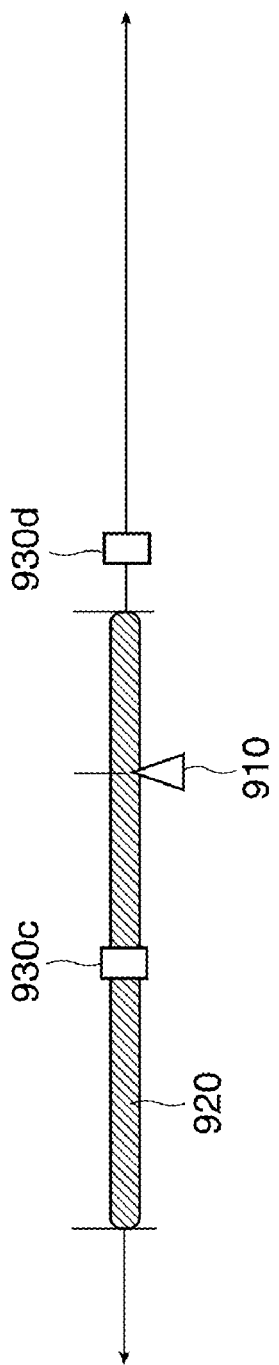

IMAGE SUPPLYING DEVICE, IMAGE SUPPLY SYSTEM, IMAGE SUPPLYING METHOD, AND COMPUTER PROGRAM PRODUCT

CROSS-REFERENCE

The present application claims priority from Japanese Patent Application No. 2009-069671 filed on Mar. 23, 2009, which is hereby incorporated by reference in its entirety.

BACKGROUND

Generally, streaming reproduction systems, formed by connecting a personal computer (PC) and a projector displaying a video in a projective manner to each other through a network, in which the PC reads out video data from a hard disk and transmits the video data to the projector, and the projector receives the video data and displays the video in a projective manner, are in use. In such streaming reproduction systems, in order not to put pressure on the recording capacity of the hard disk or the network traffic, generally, encoded video data acquired by compressing the video data is recorded in the hard disk or is output to the network. In the streaming reproduction systems using such encoded video data, the PC reads out the encoded video data from the hard disk, transmits the encoded video data, or stops the transmission. In addition, the projector receives the input encoded video data, performs a decoding process, and displays a video in a projective manner. As described above, in the streaming reproduction systems, the PC is responsible for the play control process of the encoded video data, and the projector is responsible for the decoding and display control process for decoding the received encoded video data and displaying the video data in a projective manner.

As one efficient encoding method for generating encoded video data from uncompressed video data, an MPEG2 (Moving Picture Experts Group phase 2) encoding method is known (for example, see Japanese Patent Publication No. 2002-238028). As disclosed in Japanese Patent Publication No. 2002-238028, the encoded video data (MPEG2 video data) that is encoded by using an MPEG2 encoding method, for example, can be configured by frames of three types called I frame, P frame, and B frame. The I frame is an encoded frame that is generated through an inter-frame encoding process. The I frame alone constitutes one picture. The P frame and the B frame are encoded frames that are encoded through an inter-frame predictive encoding process. The P frame or the B frame needs to refer to a frame in the front direction or frames in both directions of the front and rear directions. Thus, the P frame or the B frame alone cannot constitute one picture.

Accordingly, in a case where the MPEG2 video data is used in the above-described streaming reproduction system, when the PC performs a so-called seek operation for moving a play point from the current frame, which is currently played, to any arbitrary frame in a position after movement during a streaming playing operation, the projector can perform projection display of the entire image without any image loss by decoding one picture from the frame for a case where the frame in the position after movement is the I frame. However, for a case where the frame in the position after movement is the P frame or the B frame, the projector cannot decode one picture from the frame, and thus displays an incomplete image with an image loss in a projective manner. In other words, in the seek operation, complete image display cannot be performed by using frames other than the I frame. As described above, a frame such as the I frame that becomes a basic frame for the start of playing is referred to as a key frame.

In consideration of the above-described problem, in order not to display an incomplete picture in a case where a seek operation is performed during the MPEG2 video data playing operation, a motion picture reproduction device in which management data including positional information indicating the positions of the key frames is provided separated from the encoded video data is known (for example, see JP-A-2002-238028). In addition, a data recording device that records play control data, which is information for specifying key frames, so as to be included in multimedia data is known (see JP-A-2006-74531).

However, in any of the prior technologies described above, contents need to be produced in association with information for specifying key frames other than the encoded video data. Accordingly, there may be a burden on the operation performed by the content producer side, or data management may become complicated. In addition, in a case where general MPEG2 video data that is not associated with the information for specifying key frames or the like is played, a normal seek operation cannot be performed without the management data or play control data, whereby the versatility is decreased.

SUMMARY

Various embodiments may provide an image supplying device, an image supply system, an image supplying method, and a computer program product that allow an image display device to start to play the entire image without any image loss when the image supplying device performs a seek operation in a case where a streaming playing operation is performed by supplying encoded video data, in which special key frame specifying information is not provided, from the image supplying device to the image display device through a transmission line.

According to at least one embodiment of the disclosure, there is provided an image supplying device including: a transmission unit that transmits encoded video data including a key frame that is encoded by an inter-frame encoding process; a play point acquisition unit that receives a seek operation and acquires a first play point in a desired seek position of the encoded video data; a search range determining unit that determines a search range including the acquired first play point; a key frame searching unit that searches for key frames from the determined search range; a seek position play point determining unit that determines a position of a key frame having a shortest distance from the first play point as a second play point in a case where the key frame is detected from the search range by the key frame searching unit; and a transmission control unit that controls the transmission unit to transmit the encoded video data from the key frame corresponding to the determined second play point.

In the image supplying device according to the above embodiment, the search range determining unit determines the search range by determining a seek direction and setting distribution ranges according to the seek direction in the seek direction and a direction opposite to the seek direction with respect to the first play point.

According to at least one embodiment of the disclosure, there is provided an image supply system that is acquired by connecting an image supplying device and an image display device to each other through a transmission line. The image supplying device includes: a transmission unit that transmits encoded video data including a key frame that is encoded by an inter-frame encoding process; a play point acquisition unit that receives a seek operation and acquires a first play point in a desired seek position of the encoded video data; a search range determining unit that determines a search range including the acquired first play point; a key frame searching unit that searches for key frames from the determined search range; a seek position play point determining unit that determines a position of a key frame having a shortest distance from the first play point as a second play point in a case where the key frame is detected from the search range by the key frame searching unit; and a transmission control unit that controls the transmission unit to transmit the encoded video data from the key frame corresponding to the determined second play point. The image display device includes: a reception unit that receives the encoded video data supplied from the image supplying device; a decoding unit that generates decoded video data by decoding the received encoded video data; and an image projection unit that projects the video images based on the decoded video data.

According to at least one embodiment of the disclosure, there is provided an image supplying method including: transmitting encoded video data including a key frame that is encoded by an inter-frame encoding process; receiving a seek operation and acquiring a first play point in a desired seek position of the encoded video data; determining a search range including the acquired first play point; searching for key frames from the determined search range; determining a position of a key frame having a shortest distance from the first play point as a second play point in a case where the key frame is detected from the search range in the searching for key frames; and transmitting the encoded video data from the key frame corresponding to the determined second play point.

According to at least one embodiment of the disclosure, there is provided a computer program product that allows a computer to perform the functions including: transmitting encoded video data including a key frame that is encoded by an inter-frame encoding process; receiving a seek operation and acquiring a first play point in a desired seek position of the encoded video data; determining a search range including the acquired first play point; searching for key frames from the determined search range; determining a position of a key frame having a shortest distance from the first play point as a second play point in a case where the key frame is detected from the search range in the searching for key frames; and transmitting the encoded video data from the key frame corresponding to the determined second play point.

According to the embodiments, the image display device can start to play the entire image without any image loss when the image supplying device performs a seek operation in a case where a streaming playing operation is performed by supplying the encoded video data from the image supply device to the image display device through a transmission line.

BRIEF DESCRIPTION OF THE DRAWINGS

Non-limiting and non-exhaustive embodiments of the present disclosure will be described with reference to the accompanying drawings, wherein like reference numbers reference like elements.

FIGS. 8A to 8C are diagrams illustrating a search range according to weighted distribution in the forward direction.

FIGS. 9A to 9C are diagrams illustrating a search range according to weighted distribution in the reverse direction.

DESCRIPTION OF EMBODIMENTS

Figure 1:
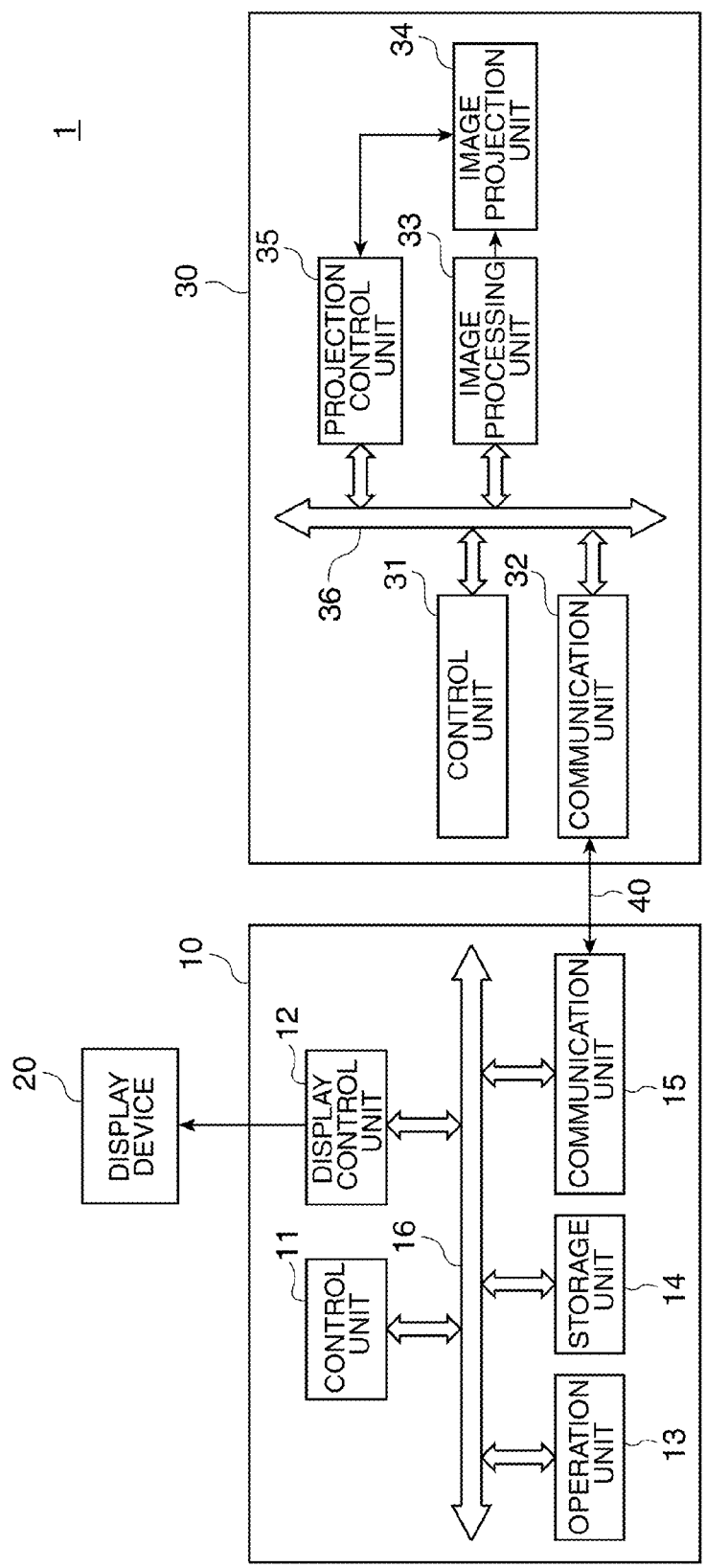
FIG. 1 is a diagram showing the configuration of a streaming reproduction system to which an image supply system according to an embodiment of the invention is applied.

Hereinafter, exemplary embodiments of the disclosure will be described with reference to the accompanying drawings. FIG. 1 is a diagram showing the configuration of a streaming reproduction system to which an image supply system according to an embodiment of the invention is applied. In the figure, the streaming reproduction system 1 includes a personal computer (PC) 10 as an image supply device, a display device 20 that is used for displaying information relating to execution of an operating system (OS) or a program for image supply that is executed by the PC 10, and a projector 30 as an image display device. The PC 10 and the projector 30 are interconnected through a network 40. In addition, the display device 20 is connected to the PC 10. The PC 10 and the display device 20 may be integrally configured as a general notebook PC.

As shown in FIG. 1, the PC 10 includes a control unit 11, a display control unit 12, an operation unit 13, a storage unit 14, and a communication unit 15. These constituent units are functionally connected to one another through a bus 16. The control unit 11 is a processing unit that controls the overall process of the PC 10 and is configured by a CPU, a RAM, a ROM, and the like that are not shown in the figure. The control unit 11 can read an OS or an application program, which is stored in the storage unit 14, into the RAM and execute the OS or the application program. In this embodiment, the control unit 11 can allow the PC 10 to operate as a streaming reproduction device by reading an image supplying program, which is stored in the storage unit 14, into the RAM and executing the program. In such a case, the control unit 11 can perform a play operation for outputting (streaming reproduction) video data from the communication unit 15 while reading out desired encoded video data from the storage unit 14 and expanding the video data in a work area of the RAM, a stop operation for stopping the play operation for streaming, and a seek operation for seeking a desired play point during playing the streaming. These operations will be described later.

The encoded video data is video data that is encoded by an inter-frame encoding process and an estimated inter-frame encoding process. As the encoded video data, for example, MPEG2 video data or MPEG4 video data can be used. In this embodiment, an example in which the MPEG2 video data is used as the encoded video data will be described. A frame that is encoded by the inter-frame encoding process, for example, an I frame of the MPEG2 video data is used as a key frame.

The display control unit 12 stores display information to be displayed in the display device 20 in an image memory, not shown in the figure, under the control of the control unit 11. Then, the display control unit 12 reads out the display information from the image memory, converts the display information into an image signal (for example, an RGB signal), and outputs the image signal. The operation unit 13 is an input unit for allowing an operator using the PC 10 to input an operation and includes a pointing device such as a keyboard, or a mouse. The storage unit 14, as described above, stores the OS, the image supplying program, and the encoded video data therein. The communication unit 15 is an interface unit for performing streaming by transmitting the encoded video data to the projector 30 that is on the client side. The communication unit 15 includes a network connector (for example, an RJ-45 connector) for a connection with the network 40.

As shown in FIG. 1, the projector 30 includes a control unit 31, a communication unit 32, an image processing unit 33, an image projection unit 34, and a projection control unit 35. Among these constituent units, the control unit 31, the communication unit 32, the image processing unit 33, and the projection control unit 35 are functionally connected to one another through a bus 36. The control unit 31 is a processing unit that controls the overall process of the projector 30 and is configured by a CPU, a RAM, a ROM, and the like that are not shown in the figure. The control unit 31 allows the communication unit 32 to receive the encoded video data transmitted from the PC 10 and temporarily store the encoded video data in the RAM, the image processing unit 33 to perform a decoding process, and the image projection unit 34 to project decoded video from the image projection unit, by reading out and executing an image supplying program stored in the ROM. The communication unit 32 is an interface unit like the communication unit 15 of the PC 10 and has a network connector (for example, an RJ-45 connector) for a connection with the network 40.

The image processing unit 33 performs a decoding process for the encoded video data supplied from the RAM under the control of the control unit 31, generates decoded video data, and supplies the decoded video data to the image projection unit 34. The image projection unit 34 includes a light source, a liquid crystal light valve, and a lens that are not shown in the figure. The image projection unit 34 inputs the decoded video data supplied from the image processing unit 33 to the liquid crystal light valve for being displayed and projects a decoded video displayed in the liquid crystal light valve on an external projection screen through a lens for being displayed by emitting light, which is emitted from the light source, onto the liquid crystal light valve. The projection control unit 35 controls operations of the light source and the liquid crystal light valve of the image projection unit 34 under the control of the control unit 31.

Figure 2:
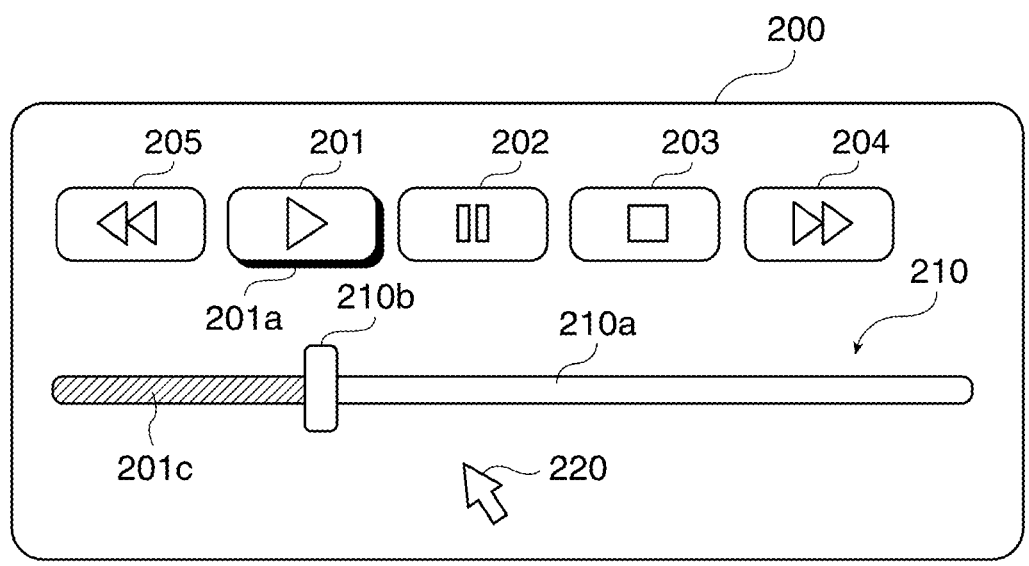
FIG. 2 is a schematic diagram of a portion, which relates to an operation for streaming play, of a GUI (Graphical User Interface) operation screen displayed in a display device.

Next, a GUI operation screen that is displayed in the display device 20 by writing the GUI operation menu into the image memory of the display control unit 12 by performing the image supplying program by using the control unit 11 of the PC 10 will be described. FIG. 2 is a schematic diagram of a portion, which relates to an operation for streaming play, of the GUI operation screen displayed in the display device 20. FIG. 2 shows a play operation screen 200 in the middle of performing streaming play. The play operation screen 200 includes GUI operation buttons of a play button 201, a pause button 202, a stop button 203, a fast forward button 204, and a fast rewind button 205. Since the play operation screen 200 shown in the figure is a case in the middle of a streaming play operation, a shade 201a indicating selection of a corresponding button is additionally displayed in the play button 201.

The play operation screen 200 includes a seek operation portion 210. This seek operation portion 210 includes a seek bar 210a and a knob 210b that can be moved to the left or right side so as to be displayed on the seek bar 210a. In addition, a progress bar 210c that is an indicator for the progress of play is displayed on the seek bar 210a in an overlapping manner. On the GUI operation screen, a pointer 220 that is indicated by the pointing device (hereinafter, assumed to be a mouse in this embodiment) of the operation unit 13 is displayed. When display of the seek operation portion 210 is performed, the control unit 11 reads out play time information that is recorded in a head portion of the MPEG2 video data, calculates the position on the seek bar 210a based on the presentation time of the currently-transmitted MPEG2 video data for a case where the play time included in the play time information set to be in correspondence with the entire length of the seek bar 210a, and determines the display position of the knob 210b and the length of the progress bar 210c.

Each GUI operation button located on the play operation screen 200 is selected by clicking a mouse button in a state in which the pointer 220 moving in accordance with an operator's mouse moving operation overlaps a selection range (for example, the display area of the GUI operation button) that is arranged in correspondence with the GUI operation button. The control unit 11 performs a process corresponding to the selected GUI operation button. For example, when the play button 201 is selected, the control unit 11 transmits the encoded video data that has been selected in advance and read out from the storage unit 14 from the communication unit 15.

When the pause button 202 is selected during the streaming playing operation, the control unit 11 transmits an I frame, which is a key frame, and then stops transmission. Then, the control unit 11 stores the play point at that time in the RAM. When the play button 201 is selected after the pause operation, the control unit 11 reads out the play point stored in the RAM and transmits the encoded video data, which is read out from the storage unit 14 with the play point as the lead, by using the communication unit 15. In addition, when the stop button 203 is selected during the streaming playing operation, the control unit 11 transmits an I frame, which is a key frame and then stops transmission.

When the fast rewind button 204 is selected during the streaming playing operation, the control unit 11 progresses the play point in the play progress direction during a period in which the fast forward button 204 is selected (during a state dragged by the mouse button), searches for key frames, and transmits only the key frames that are detected after a predetermined time interval elapses. Then, when the fast forward button 204 is unselected (when the mouse button is released), a play point at that time point is acquired, and a key frame detecting process to be described later is performed. Then, the position of the key frame detected in this process is set as a play point, and the encoded video data, which is read out from the storage unit 14 with the play point as the lead, is transmitted from the communication unit 15.

On the other hand, when the fast rewind button 205 is selected during the streaming playing operation, the control unit 11 progresses the play point in a direction opposite to the play progress direction during a period in which the fast rewind button 205 is selected, searches for key frames, and transmits only key frames that are detected after a predetermined time interval elapses. Then, when the fast rewind button 205 is unselected, a play point at that time point is acquired, and the key frame detecting process to be described later is performed. Thereafter, the position of the key frame that is detected in this process is set as a play point, and the encoded video data, which is readout from the storage unit 14 with the play point as the lead, is transmitted from the communication unit 15.

The knob 210b of the seek operation unit 210 is moved along the seek bar 210a to the left or right side so as to be displayed by dragging the pointer 220, which moves in accordance with an operator's mouse moving operation, in a state overlapping a selection range (for example, the display area of the knob 210b) that is arranged in correspondence with the knob 210b. In addition, by clicking the pointer 220 in a state overlapping an arbitrary position in the selection range (for example, the display area of the seek bar 210a) that is arranged in correspondence with the seek bar 210a, the knob 210b can be moved to be displayed in that position.

Figure 3A:
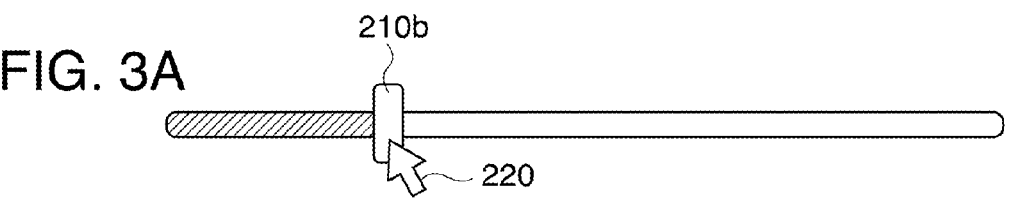
FIGS. 3A to 3C are diagrams showing an exemplary seek operation in the forward direction by using a seek operation unit.
Figure 3B:
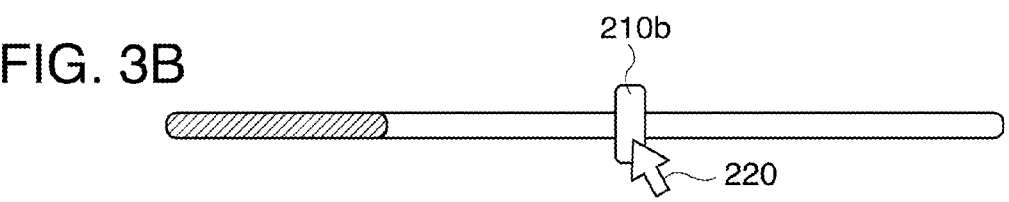
Figure 3C:
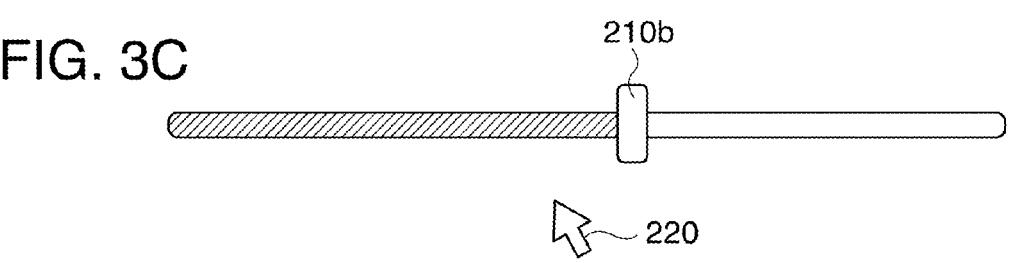
Figure 4A:
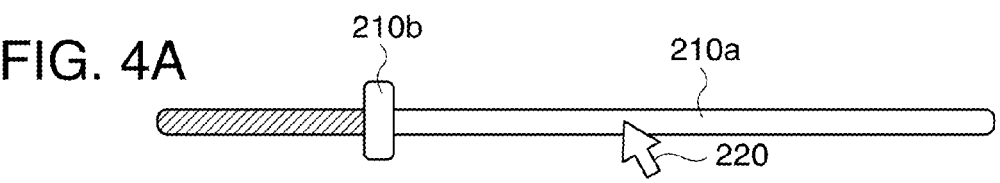
FIGS. 4A and 4B are diagrams showing another exemplary seek operation in the forward direction by using a seek operation unit.
Figure 4B:
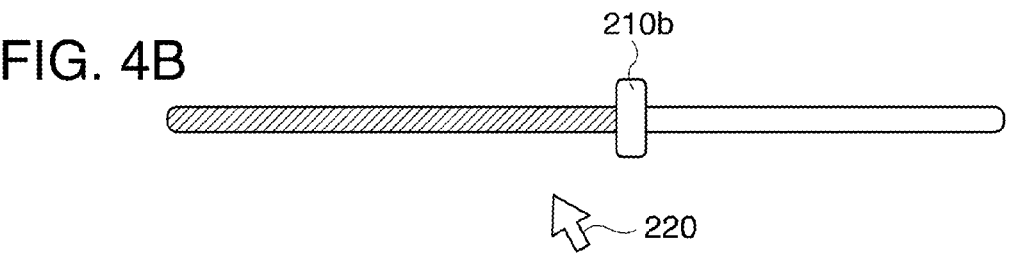

In a seek operation for the forward direction, for example, as shown in FIG. 3A, in a case where the pointer 220 is dragged to the right side (the play progress direction side) in a state in which the pointer 220 overlaps the knob 210b as in FIG. 3B and is released in a desired position, the knob 210b is fixed to be displayed in the position as shown in FIG. 3C. In addition, as shown in FIG. 4A, in a case where the mouse button is clicked in a state in which the pointer 220 overlaps a desired position located to the right side (the play progress direction side) of the knob 210b of the seek bar 210a, the knob 210b is moved to be displayed in the position as shown in FIG. 4B.

Figure 5A:
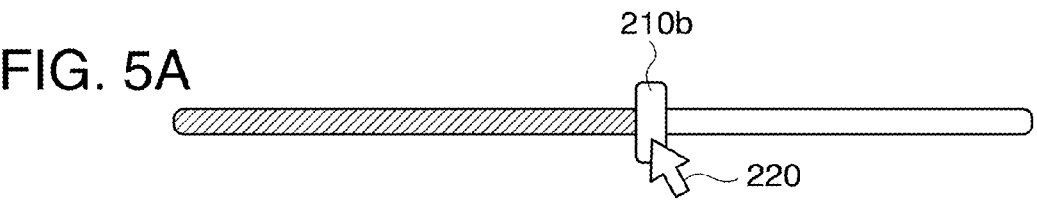
FIGS. 5A to 5C are diagrams showing an exemplary seek operation in the reverse direction by using a seek operation unit.
Figure 5B:
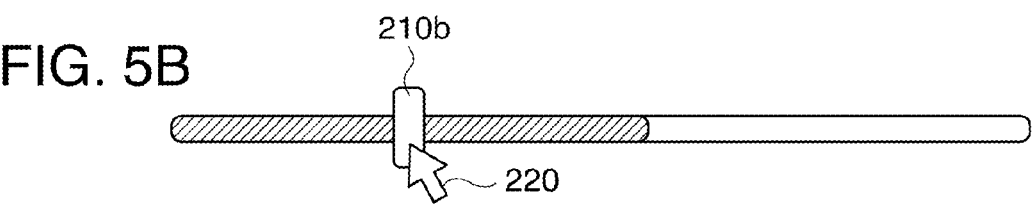
Figure 5C:
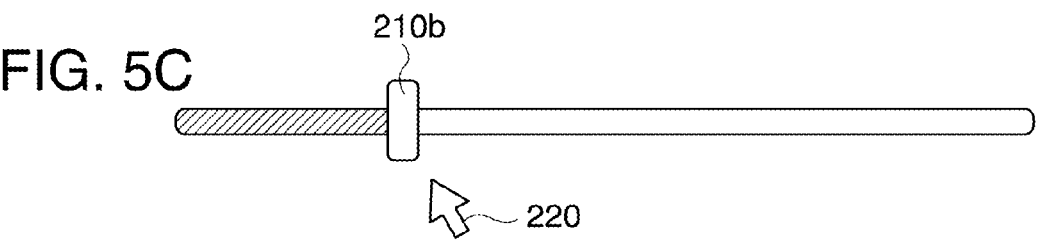
Figure 6A:
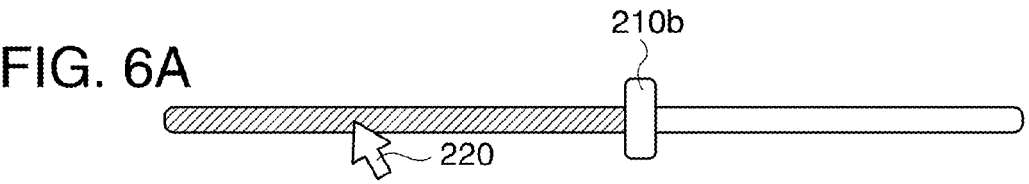
FIGS. 6A and 6B are diagrams showing another exemplary seek operation in the reverse direction by using a seek operation unit.
Figure 6B:
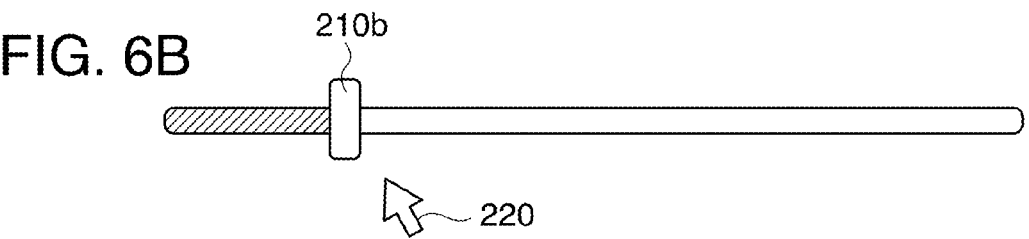

In a seek operation for the reverse direction, for example, as shown in FIG. 5A, in a case where the pointer 220 is dragged to the left side (the side opposite to the play progress direction) in a state in which the pointer 220 overlaps the knob 210b as in FIG. 5B and is released in a desired position, the knob 210b is fixed to be displayed in the position as shown in FIG. 5C. In addition, as shown in FIG. 6A, in a case where the mouse button is clicked in a state in which the pointer 220 overlaps a desired position located to the left side (the opposite side to the play progress direction) of the knob 210b of the seek bar 210a, the knob 210b is moved to be displayed in the position as shown in FIG. 6B.

During the streaming playing operation, when the knob 210b in the dragged state is moved in the play progress direction and the mouse button is released in a desired position or when the pointer 220 is clicked in a state overlapping a desired position located to the right side (the play progress direction side) of the knob 210b on the seek bar 210a, the control unit 11 acquires a play point corresponding to the position after the movement and performs the key frame detecting process to be described later. Then, the key frame detected in the process is set as the play point, and the encoded video data, which is read out from the storage unit 14 with the play point as the lead, is transmitted from the communication unit 15.

During the streaming playing operation, when the knob 210b in the dragged state is moved in the direction opposite to the play progress direction and the mouse button is released in a desired position or when the pointer 220 is clicked in a state overlapping a desired position located to the left side (the side opposite to the play progress direction) of the knob 210b on the seek bar 210a, the control unit 11 acquires a play point corresponding to the position after the movement and performs the key frame detecting process to be described later. Then, the key frame detected in the process is set as the play point, and the encoded video data, which is read out from the storage unit 14 with the play point as the lead, is transmitted from the communication unit 15.

Next, the key frame detecting process performed by the control unit 11 of the PC 10 will be described with reference to a flowchart shown in FIG. 7. When the control unit 11 acquires the play point in accordance with a release operation from the dragged state of the fast forward button 204 or the fast rewind button 205 or an operation of the seek operation portion 210, the key frame detecting process shown in the figure is started. First, the control unit 11 determines whether or not a frame corresponding to the acquired play point is a key frame (S701). When the frame corresponding to the play point is determined not to be a key frame (S701: NO), the control unit 11 determines the seek direction (S702). The seek direction is determined based on the positional relationship between a play point that is currently played and the acquired play point. The seek direction can be determined to be a "forward direction" (the fast forward direction) in a case where the acquired play point has progressed more than the point that is currently played. On the other hand, the seek direction can be determined to be a "reverse direction" (the fast rewind direction) in a case where the acquired play point is behind the point that is currently played.

When determining the seek direction to be the forward direction (S702: forward direction), the control unit 11 sets a search range according to weighted distribution in the forward direction (S703). Here, the setting of a search range according to the weighted distribution in the forward direction will be described in detail. FIGS. 8A to 8C are schematic diagrams showing an example of the search range set in a range including the acquired play point. As shown in FIG. 8A, the control unit 11 sets a search range 820 that is a range extending in the forward and reverse directions at the ratio of 3:1 with respect to the acquired play point 810. For example, the control unit 11 sets a search range that has a length corresponding to three seconds in the forward direction and has a length corresponding to one second in the reverse direction.

Figure 7:
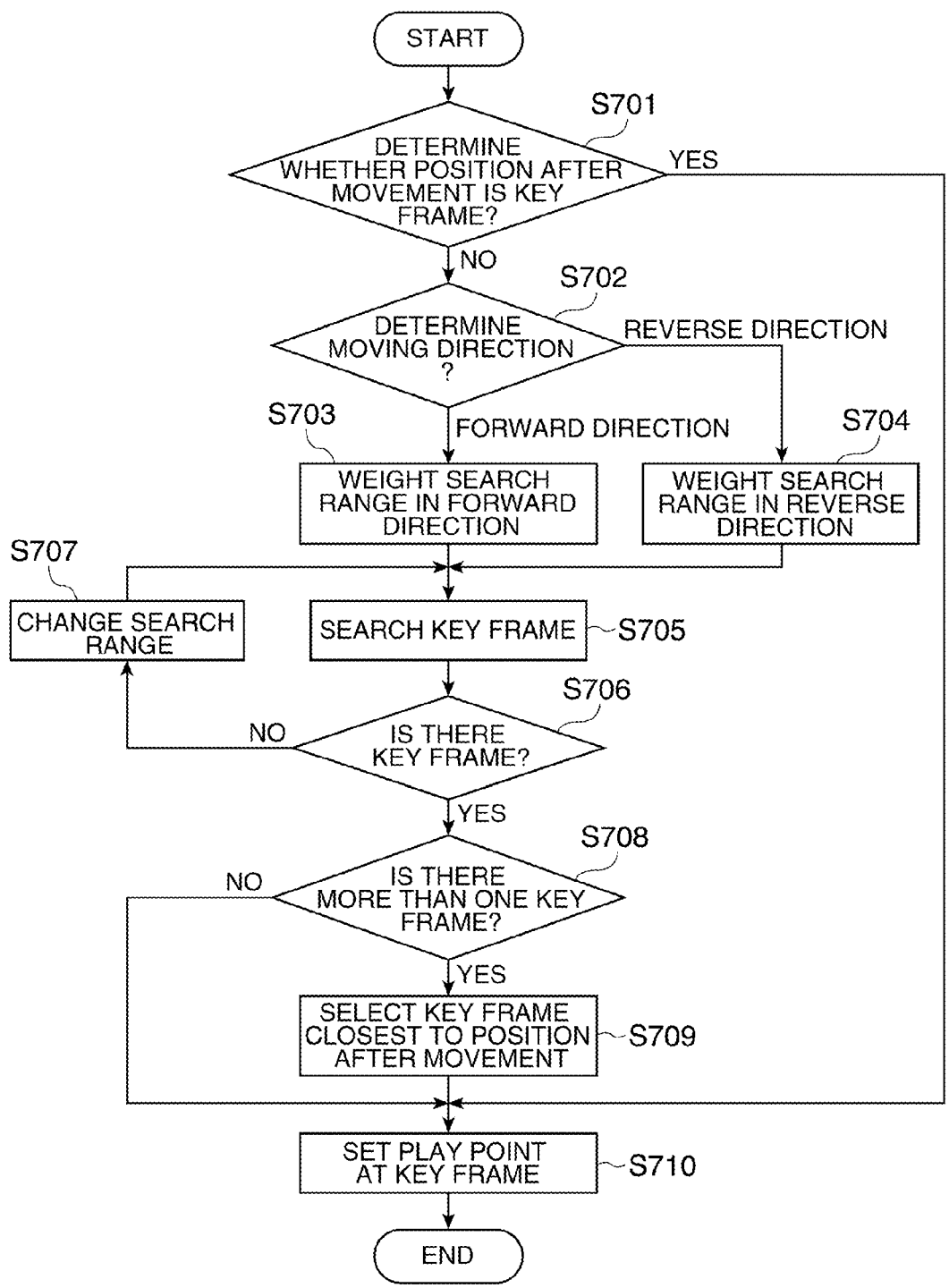
FIG. 7 is a flowchart illustrating a key frame searching process.

With reference back to the flowchart shown in FIG. 7, when determining the seek direction to be the reverse direction (S702: reverse direction) in the seek-direction determining process of the process of Step S702, the control unit 11 sets a search range according to weighted distribution in the reverse direction (S704). Here, the setting of a search range according to the weighted distribution in the reverse direction will be described in detail. FIGS. 9A to 9C are schematic diagrams showing an example of the search range set in a range including the acquired play point. As shown in FIG. 9A, the control unit 11 sets a search range 920 that is a range extending in the reverse and forward directions at the ratio of 3:1 with respect to the acquired play point 910. For example, the control unit 11 sets a search range that has a length corresponding to three seconds in the reverse direction and has a length corresponding to one second in the forward direction.

With reference back to the flowchart shown in FIG. 7, when the search range is set in the process of Step S703 or Step S704, the control unit 11 searches for key frames from the search range and acquires distances from the acquired play point to the key frames (Step S705). For example, in the case of the forward direction shown in FIG. 8B, the control unit 11 searches for key frames from the search range 820 and detects key frames 830a and 830b. Then, distances from the play point 810 to each key frame are acquired. On the other hand, for example, in the case of the reverse direction shown in FIG. 9B, the control unit 11 searches for key frames from the search range 920 and detects key frames 930a and 930b. Then, distances from the play point 910 to each key frame are acquired.

With reference back to the flowchart shown in FIG. 7, when determining that there is a key frame in the search range as a result of the key frame searching process in the process of Step S705 (S706: YES), the control unit 11 determines whether the number of the key frames is one or more (S708). Then, when determining that the number of the detected key frames is more than one (S708: YES), the control unit 11 selects a key frame having a shortest distance from the acquired play point (S709). For example, in the exemplary case of the forward direction shown in FIG. 8B, the control unit 11 selects a key frame 830*a* as the key frame closest to the play point 810. On the other hand, for example, in the exemplary case of the reverse direction shown in FIG. 9B, the control unit 11 selects a key frame 930*b* as the key frame closest to the play point 910.

With reference back to the flowchart shown in FIG. 7, when one key frame is selected in the process of Step S709, the control unit 11 selects the play point corresponding to the selected key frame as a play point of the actual seek position (S710).

On the other hand, when the frame corresponding to the acquired play point is a key frame in the process of Step S701 (Step S701: YES) and the number of the detected key frame in the search range is determined to be one in the process of Step S708 (S708: NO), the control unit 11 proceeds to the process of Step S710. FIGS. 8C and 9C show exemplary cases where one key frame is detected from the search range.

On the other hand, when determining that there is not any key frame in the search range in Step S706 (S706: NO), the control unit 11 changes the search range that is currently set and returns back to the process of Step S705 (S707). As a method of changing this search range, for example, the following methods can be used.

The first example is a method in which the search range is enlarged without changing the ratio of lengths in the forward direction and the reverse direction with respect to the acquired play point. For example, a state in which a search range extending a length corresponding to three seconds in the forward direction and extending a length corresponding to one second in the reverse direction is set is changed to a search range extending a length for six seconds in the forward direction and extending a length corresponding to two seconds in the reverse direction. The second example is a method in which the position of the search range is shifted without changing the area of the search range. For example, in the case of the forward direction, the search range is shifted in the forward direction, and in the case of the reverse direction, the search range is shifted in the reverse direction. The third example is a method in which the search range is enlarged from the play point only in the forward direction for the case of the forward direction, and the search range is enlarged from the play point only in the reverse direction for the case of the reverse direction. The above-described first to third examples may be appropriately combined.

Next, a process of receiving the encoded video data, performing a decoding process, and projecting a video so as to be displayed by executing an image supplying program by using the control unit 31 of the projector 30 will be described. When receiving the encoded video data transmitted from the PC 10 by using the communication unit 32, the projector 30 temporarily stores the encoded video data in the RAM, reads out the encoded video data from the RAM, and supplies the encoded video data to the image processing unit 33. Then, the image processing unit 33 performs a decoding process for the encoded video data. Next, the image processing unit 33 supplies the decoded video data to the image projection unit 34, and the image projection unit 34 projects a video.

As described above, according to this embodiment, in a streaming reproduction system that is acquired by connecting a PC and a projector to each other through a network, when the PC performs a play control process such as a seek process, a fast forward play process, or a fast rewind play process, the play point in a position after movement can be assuredly set by using a key frame. Accordingly, when a projection display is resumed after a seek operation, completion of fast forward, or completion of fast rewind, a projection display can be started based on the entire image that does not have any image loss.

In addition, according to this embodiment, when the play point in the position after movement is determined, the search range is set in the forward direction and the reverse direction with weighted distribution according to the seek direction. By limiting the search range as described above, the time required for determination on the play point can be shortened. In addition, it is preferable that, in the setting of the search range, the weighting factor for the forward direction is set to be high for the seek operation performed in the forward direction, and the weighting factor for the reverse direction is set to be high for the seek operation performed in the reverse direction. By distributing the weighting factors as described above, a situation in which projection display is moved backwards to a great extent in the seek direction and then resumed can be prevented.

In addition, the image supplying program according to this embodiment may be recorded on a computer-readable recording medium, and the program recorded on this recording medium is read into a computer system and is executed. In addition, the "computer system" described here includes an OS and hardware such as a peripheral device. A "computer-readable recording medium" is a portable recording medium such as a flexible disk, a magneto-optical disc, a ROM, or a CD-ROM or a memory device such as a hard disk that is built in the computer system. In addition, the "computer-readable recording medium" may include a member that dynamically maintains a program for a short time period such as a communication line in a case where a the program is transmitted through a network such as the Internet or a telephone network or a member that maintains the program for a predetermined time interval such as a volatile memory disposed inside a computer system that serves as a server or a client in such a case. In addition, the image supplying program may be configured for implementing a part of the above-described function or may be combined with a program that is entirely recorded in the computer system for implementing the above-described function.

In addition, the connection interface between the PC and the projector is not limited to a network. Thus, a serial bus such as a USB (Universal Serial Bus) or IEEE1394 may be used.

The embodiment of the invention has been described as above. However, detailed configurations are not limited to the embodiment and include designs or the like within the scope not departing from the basic concept of the invention.

What is claimed is:

1. An image supplying device comprising:
    a transmission unit that transmits encoded video data including a key frame that is encoded by an inter-frame encoding process;
    a play point acquisition unit that receives a seek operation and acquires a first play point in a desired seek position of the encoded video data;
    a search range determining unit that determines a search range including the acquired first play point;
    a key frame searching unit that searches for key frames from the determined search range;
    a seek position play point determining unit that determines a position of a key frame having a shortest distance from the first play point as a second play point in a case where the key frame is detected from the search range by the key frame searching unit; and a transmission control unit that controls the transmission unit to transmit the encoded video data from the key frame corresponding to the determined second play point.

2. The image supplying device according to claim 1, wherein the search range determining unit determines the search range by determining a seek direction and setting distribution ranges according to the seek direction in the seek direction and a direction opposite to the seek direction with respect to the first play point.

3. The image supplying device according to claim 2, wherein the search range determining unit determines the search range by enlarging the search range without changing the ratio of lengths in the forward direction and the reverse direction with respect to the acquired play point, in case of determining that there is not any key frame in the search range.

4. The image supplying device according to claim 2, wherein the search range determining unit determines the search range by shifting the position of the search range without changing the area of the search range, in case of determining that there is not any key frame in the search range.

5. The image supplying device according to claim 2, wherein the search range determining unit determines the search range by enlarging the search range from the play point in the forward direction for the case of the forward direction, or from the play point in the reverse direction for the case of the reverse direction, in case of determining that there is not any key frame in the search range.

6. An image supply system that is acquired by connecting the image supplying device in accordance with claim 1 and an image display device to each other through a transmission line, wherein the image display device comprises:
a reception unit that receives the encoded video data supplied from the image supplying device;
a decoding unit that generates decoded video data by decoding the received encoded video data; and
an image projection unit that projects the decoded video data.

7. An image supplying method comprising:
transmitting encoded video data including a key frame that is encoded by an inter-frame encoding process;
receiving a seek operation and acquiring a first play point in a desired seek position of the encoded video data;
determining a search range including the acquired first play point;
searching for key frames from the determined search range;
determining a position of a key frame having a shortest distance from the first play point as a second play point in a case where the key frame is detected from the search range in the searching for key frames; and
transmitting the encoded video data from the key frame corresponding to the determined second play point.

8. The image supplying method according to claim 7, wherein the search range is determined by determining a seek direction and setting distribution ranges according to the seek direction in the seek direction and a direction opposite to the seek direction with respect to the first play point.

9. The image supplying method according to claim 8, wherein the search range is determined by enlarging the search range without changing the ratio of lengths in the forward direction and the reverse direction with respect to the acquired first play point, in case of determining that there is not any key frame in the search range.

10. The image supplying method according to claim 8, wherein the search range is determined by shifting the position of the search range without changing the area of the search range, in case of determining that there is not any key frame in the search range.

11. The image supplying method according to claim 8, wherein the search range is determined by enlarging the search range from the first play point in the forward direction for the case of the forward direction, or from the first play point in the reverse direction for the case of the reverse direction, in case of determining that there is not any key frame in the search range.

12. A computer program product embodied in at least one computer readable medium and comprising computer instructions executed by a computer to perform the functions of:
transmitting encoded video data including a key frame that is encoded by an inter-frame encoding process;
receiving a seek operation and acquiring a first play point in a desired seek position of the encoded video data;
determining a search range including the acquired first play point;
searching for key frames from the determined search range;
determining a position of a key frame having a shortest distance from the first play point as a second play point in a case where the key frame is detected from the search range in the searching for key frames; and
transmitting the encoded video data from the key frame corresponding to the determined second play point.

* * * * *